(12) United States Patent
Aizawa et al.

(10) Patent No.: US 9,521,234 B2
(45) Date of Patent: Dec. 13, 2016

(54) INFORMATION PROCESSING APPARATUS, DISPLAY CONTROL METHOD AND RECORDING MEDIUM

(71) Applicant: CANON KABUSHIKI KAISHA, Tokyo (JP)

(72) Inventors: Michio Aizawa, Yokohama (JP); Hitoshi Aoki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/790,100

(22) Filed: Jul. 2, 2015

(65) Prior Publication Data
US 2016/0006854 A1 Jan. 7, 2016

(30) Foreign Application Priority Data

Jul. 7, 2014 (JP) .................. 2014-139390

(51) Int. Cl.
H04M 1/00 (2006.01)
H04M 1/725 (2006.01)
G10L 17/22 (2013.01)
G10L 15/20 (2006.01)

(52) U.S. Cl.
CPC .......... *H04M 1/72522* (2013.01); *G10L 15/20* (2013.01); *G10L 17/22* (2013.01); *H04M 1/72566* (2013.01); *H04M 2250/12* (2013.01); *H04M 2250/74* (2013.01)

(58) Field of Classification Search
CPC ..... G10L 15/20; G10L 17/22; H04M 1/72522; H04M 1/72566; H04M 2250/12; H04M 2250/74

USPC .......... 455/563, 456.3, 412.2, 41.2; 709/203, 709/206; 715/753, 781, 733, 800, 728; 704/235, 704/270.1; 705/26.61, 27.1, 27.2; 707/722, 4, 707/251; 209/546
See application file for complete search history.

(56) References Cited

U.S. PATENT DOCUMENTS

| | | | |
|---|---|---|---|
| 9,001,254 B2 * | 4/2015 | Kang ............... | H04N 5/232 348/333.02 |
| 2002/0036160 A1 * | 3/2002 | Reed ............... | B07C 3/00 209/546 |
| 2007/0088687 A1 * | 4/2007 | Bromm ............. | G06F 17/30663 |
| 2007/0118382 A1 * | 5/2007 | Kuboyama .......... | G10L 15/22 704/275 |

(Continued)

FOREIGN PATENT DOCUMENTS

JP 2008-109263 A 5/2008

*Primary Examiner* — Tan H Trinh
(74) *Attorney, Agent, or Firm* — Carter, DeLuca, Farrell & Schmidt, LLP

(57) ABSTRACT

The information processing apparatus performs a voice communication with a counterpart device which comprises a voice communication function through a voice communication unit. The information processing apparatus performs voice recognition processing of first voice and second voice, the first voice is the voice which is transmitted to the counterpart device by a voice communication through the voice communication unit, the second voice is the voice which is input from the counterpart device, and searches one or more applications according to a recognition result of the voice recognition unit. The information processing apparatus displays an object for starting the application searched on a display section. Thereby, the information processing apparatus prevents starting the application which is not intended by the user.

17 Claims, 12 Drawing Sheets

| DIALOGUE NO | SPEAKER | DIALOGUE CONTENT | SCHEDULER BASIC SCORE | SCORE | BROWSER BASIC SCORE | SCORE |
|---|---|---|---|---|---|---|
| 1 | COMMUNI-CATION COUNTER-PART | YOU' LL HAVE A DENTAL CHECKUP NEXT TIME. | | 0 | | 0 |
| 2 | COMMUNI-CATION COUNTER-PART | WHEN WOULD YOU LIKE TO MAKE AN APPOINTMENT? | 0.8 | 0.8 | | 0 |
| 3 | USER | "SATURDAY" IS CONVENIENT FOR ME. | 0.7 | 1.3 | | 0 |
| 4 | COMMUNI-CATION COUNTER-PART | HOW ABOUT "DECEMBER 28TH" ? | 0.7 | 1.7 | | 0 |
| 5 | USER | I' LL "CHECK" . WAIT A MOMENT, PLEASE. | | 1.4 | 0.5 | 0.5 |
| <USER HOLDS INFORMATION PROCESSING APPARATUS AWAY FROM HIS EAR, CHECKS SCHEDULER APP, AND RETURNS INFORMATION PROCESSING APPARATUS TO HIS EAR.> | | | | | | |
| 6 | USER | HELLO. | | 1.1 | | 0.4 |
| 7 | USER | I' LL BE AVAILABLE ON "DECEMBER 28TH" . | 0.7 | 1.6 | | 0.3 |
| 8 | COMMUNI-CATION COUNTER-PART | I MADE AN APPOINTMENT FOR YOU ON "DECEMBER 28TH" . | 0.7 | 2.0 | | 0.2 |
| .. | .. | | | | | |

(56) References Cited

U.S. PATENT DOCUMENTS

| | | | |
|---|---|---|---|
| 2008/0086260 A1* | 4/2008 | Lee | G01C 21/3608 701/532 |
| 2008/0144788 A1* | 6/2008 | You | H04L 12/66 379/93.15 |
| 2009/0240673 A1* | 9/2009 | Nagasaki | G10L 15/26 |
| 2010/0076763 A1* | 3/2010 | Ouchi | 704/246 |
| 2010/0234072 A1* | 9/2010 | Ambiru | H04M 1/72552 455/563 |
| 2011/0010376 A1* | 1/2011 | Kawauchi | G01C 21/36 707/758 |
| 2011/0230176 A1* | 9/2011 | Kumar | H04L 12/5895 455/414.3 |
| 2012/0209804 A1* | 8/2012 | Lee | G06F 17/30887 707/610 |
| 2012/0239761 A1* | 9/2012 | Linner | G06F 17/2765 709/206 |
| 2012/0240062 A1* | 9/2012 | Passmore | H04L 12/588 715/758 |
| 2012/0282950 A1* | 11/2012 | Meyer | G06Q 30/0259 455/456.3 |
| 2013/0054243 A1* | 2/2013 | Ichikawa | G06F 3/167 704/246 |
| 2013/0069976 A1* | 3/2013 | Lee | G06F 3/016 345/619 |
| 2013/0151336 A1* | 6/2013 | Goralnick | G06Q 30/0252 705/14.54 |
| 2013/0166290 A1* | 6/2013 | Suzuki | G10L 15/22 704/231 |
| 2013/0174058 A1* | 7/2013 | Kaul | G06F 3/0481 715/753 |
| 2013/0218572 A1* | 8/2013 | Cho | G06F 3/167 704/275 |
| 2013/0331147 A1* | 12/2013 | Chang | H04W 4/18 455/556.1 |
| 2014/0006027 A1* | 1/2014 | Kim | G10L 15/22 704/246 |
| 2014/0019462 A1* | 1/2014 | Heck | G06F 17/30286 707/754 |
| 2014/0059030 A1* | 2/2014 | Hakkani-Tur | G06F 17/30663 707/706 |
| 2014/0122075 A1* | 5/2014 | Bak | G10L 15/32 704/246 |
| 2014/0169795 A1* | 6/2014 | Clough | G06F 19/3418 398/106 |
| 2014/0289323 A1* | 9/2014 | Kutaragi | G06Q 50/01 709/203 |
| 2014/0298247 A1* | 10/2014 | Cho | G06F 3/0488 715/781 |
| 2014/0304605 A1* | 10/2014 | Ohmura | G06F 3/167 715/728 |
| 2015/0042543 A1* | 2/2015 | Kim | G02B 27/017 345/8 |
| 2015/0120300 A1* | 4/2015 | Maruta | G06F 17/30746 704/251 |
| 2015/0192425 A1* | 7/2015 | Mizuno | G01C 21/3608 701/410 |
| 2015/0206530 A1* | 7/2015 | Choi | G10L 15/22 704/249 |
| 2015/0255087 A1* | 9/2015 | Otani | G10L 25/48 704/246 |
| 2015/0262005 A1* | 9/2015 | Ohmura | G06F 3/165 348/77 |
| 2015/0279363 A1* | 10/2015 | Furumoto | G10L 15/32 704/249 |
| 2016/0034253 A1* | 2/2016 | Bang | G06F 3/167 715/728 |
| 2016/0036751 A1* | 2/2016 | Ban | G06F 17/3087 455/414.1 |

* cited by examiner

| APPLICATON | KEYWORD | BASIC SCORE |
|---|---|---|
| SCHEDULER APP | SCHEDULER | 1.0 |
| | SCHEDULE | 1.0 |
| | APPOINTMENT | 0.8 |
| | DAY OF WEEK | 0.7 |
| | DATE | 0.7 |
| | PLAN | 0.5 |
| | CHECK | 0.5 |
| | .. | |
| BROWSER APP | BROWSER | 1.0 |
| | INTERNET | 0.9 |
| | CHECK | 0.5 |
| | .. | |
| MEMO PAD APP | MEMO PAD | 1.0 |
| | MEMO | 0.9 |
| | .. | |
| SETTING APP | SETTING | 1.0 |
| | .. | |
| MAIL APP | MAIL | 1.0 |
| | E-MAIL | 1.0 |
| | .. | |

FIG. 3

| DIALOGUE NO. | SPEAKER | DIALOGUE CONTENT | SCHEDULER | | BROWSER | |
|---|---|---|---|---|---|---|
| | | | BASIC SCORE | SCORE | BASIC SCORE | SCORE |
| 1 | COMMUNI-CATION COUNTER-PART | YOU'LL HAVE A DENTAL CHECKUP NEXT TIME. | | 0 | | 0 |
| 2 | COMMUNI-CATION COUNTER-PART | WHEN WOULD YOU LIKE TO MAKE AN APPOINTMENT? | 0.8 | 0.8 | | 0 |
| 3 | USER | "SATURDAY" IS CONVENIENT FOR ME. | 0.7 | 1.3 | | 0 |
| 4 | COMMUNI-CATION COUNTER-PART | HOW ABOUT "DECEMBER 28$^{TH}$"? | 0.7 | 1.7 | | 0 |
| 5 | USER | I'LL "CHECK". WAIT A MOMENT, PLEASE. | | 1.4 | 0.5 | 0.5 |
| | \<USER HOLDS INFORMATION PROCESSING APPARATUS AWAY FROM HIS EAR, CHECKS SCHEDULER APP, AND RETURNS INFORMATION PROCESSING APPARATUS TO HIS EAR.\> | | | | | |
| 6 | USER | HELLO. | | 1.1 | | 0.4 |
| 7 | USER | I'LL BE AVAILABLE ON "DECEMBER 28$^{TH}$". | 0.7 | 1.6 | | 0.3 |
| 8 | COMMUNI-CATION COUNTER-PART | I MADE AN APPOINTMENT FOR YOU ON "DECEMBER 28$^{TH}$". | 0.7 | 2.0 | | 0.2 |
| | .. | .. | | | | |

FIG. 4

| DIALOGUE NO. | SPEAKER | DIALOGUE CONTENT | SCHEDULER | | MAIL | |
|---|---|---|---|---|---|---|
| | | | BASIC SCORE | SCORE | BASIC SCORE | SCORE |
| 1 | COMMUNI-CATION COUNTER-PART | HAVE YOU DECIDED ON "PLAN" FOR DRINKING PARTY? | 0.5 | 0.5 | | 0 |
| 2 | USER | YES. | | 0.4 | | 0 |
| 3 | COMMUNI-CATION COUNTER-PART | PLEASE LET ME KNOW THE "DATE". | 0.7 | 1.0 | | 0 |
| 4 | USER | WAIT A MOMENT, PLEASE. | | 0.8 | | 0 |
| <USER TOUCHES MUTE BUTTON (MUTE FUNCTION: ON)> | | | | | | |
| 5 | USER | "E-MAIL" | | 0.6 | 1.0 | 1.5 |
| <USER CHECKS E-MAIL AND TOUCHES MUTE BUTTON (MUTE FUNCTION: OFF)> | | | | | | |
| 6 | USER | HELLO. | | 0.5 | | 1.2 |
| 7 | USER | IT WILL BE ON "DECEMBER 28TH". | 0.7 | 1.1 | | 1.0 |
| | COMMUNI-CATION COUNTER-PART | THANK YOU. | | 0.9 | | 0.8 |
| | .. | .. | | | | |

FIG. 5

| DIALOGUE NO. | SPEAKER | DIALOGUE CONTENT | BROWSER BASIC SCORE | BROWSER SCORE | SCHEDULER BASIC SCORE | SCHEDULER SCORE | MEMO PAD BASIC SCORE | MEMO PAD SCORE | SETTING BASIC SCORE | SETTING SCORE |
|---|---|---|---|---|---|---|---|---|---|---|
| 1 | COMMUNI-CATION COUNTER-PART | THIS IS CALL CENTER. |  | 0 |  | 0 |  | 0 |  | 0 |
| 2 | COMMUNI-CATION COUNTER-PART | HOW CAN I HELP YOU? |  | 0 |  | 0 |  | 0 |  | 0 |
| 3 | USER | I CANNOT CONNECT TO THE "INTERNET". | 0.9 | 0.9 |  | 0 |  | 0 |  | 0 |
| 4 | COMMUNI-CATION COUNTER-PART | I UNDERSTAND. |  | 0.7 |  | 0 |  | 0 |  | 0 |
| 5 | COMMUNI-CATION COUNTER-PART | PLEASE LET ME KNOW YOUR CUSTOMER ID. |  | 0.6 |  | 0 |  | 0 |  | 0 |
| 6 | USER | I'LL "CHECK" IT. WAIT A MOMENT, PLEASE. |  | 0.5 | 0.5 | 0.5 |  | 0 |  | 0 |
| <USER HOLDS INFORMATION PROCESSING APPARATUS AWAY FROM HIS EAR.> ||||||||||
| 7 | USER | "MEMO PAD". |  | 0.4 |  | 0.4 | 1.0 | 1.5 |  | 0 |
| <USER CHECKS MEMO PAD APP AND TOUCHES SPEAKER BUTTON.> ||||||||||
| 8 | USER | HELLO. |  | 0.3 |  | 0.3 |  | 1.2 |  | 0 |
| 9 | USER | THE ID IS 12345. |  | 0.2 |  | 0.2 |  | 1.0 |  | 0 |
| 10 | COMMUNI-CATION COUNTER-PART | I "CHECKED". |  | 0.2 | 0.5 | 0.7 |  | 0.8 |  | 0 |
| 11 | COMMUNI-CATION COUNTER-PART | PLEASE START "SETTING" APP. |  | 0.2 |  | 0.6 |  | 0.6 | 1.0 | 1.0 |
| <USER STARTS SETTING APP.> ||||||||||
| 12 | USER | I STARTED. |  | 0.2 |  | 0.5 |  | 0.5 |  | 0.8 |
| .. | .. | .. |  |  |  |  |  |  |  |  |

FIG. 6

INFORMATION PROCESSING APPARATUS, DISPLAY CONTROL METHOD AND RECORDING MEDIUM

BACKGROUND OF THE INVENTION

Field of the Invention

The present disclosure relates to a technology for starting an application according to content of voice communication in an information processing apparatus which is capable of voice communication, such as portable phones, smart phones, tablet terminals and the like.

Description of the Related Art

In the information processing apparatus capable of voice communication, a user of the information processing apparatus sometimes wishes to use application other than telephone application during the voice communication. For example, this is a case where the user wishes to check his schedule by schedule application during the voice communication. In this case, it is necessary to operate the information processing apparatus during the voice communication so that the voice communication may be interrupted. In particular, when some complicated operation, such as when the user needs to temporarily go back to a home screen to start application, is required, it is likely that the voice communication is interrupted.

Japanese Patent Application Laid-open No. 2008-109263 discloses a portable terminal device, which starts application based on contents of voice communication during the voice communication. The portable terminal device (information processing apparatus) disclosed in Japanese Patent Application Laid-open No. 2008-109263 recognizes a voice of a user of the information processing apparatus and a voice of the communication counterpart who are in the voice communication with each other and start the corresponding application when a keyword which is previously registered is recognized. Thereby, even during the voice communication, the information processing apparatus can start the application without interruption.

The information processing apparatus disclosed in Japanese Patent Application Laid-open No. 2008-109263 does not distinguish the voice of the user from the voice of the communication counterpart who are in the voice communication with each other. Regardless of whether it is the voice of the user or the voice of the communication counterpart, if a particular keyword is included in the voice recognized, the information processing apparatus starts the corresponding application. Thereby, the application which is not intended by the user of the information processing apparatus may be started.

The main object of the present disclosure is to provide an information processing apparatus which prevents starting the application which is not intended by the user.

SUMMARY OF THE INVENTION

The information processing apparatus of the present disclosure comprises a voice communication unit configured to perform a voice communication with a counterpart device which comprises a voice communication function; a voice recognition unit configured to perform voice recognition processing of a first voice and a second voice, the first voice is the voice which is transmitted to the counterpart device by a voice communication through the voice communication unit, and the second voice is the voice which is input from the counterpart device; a search unit configured to search one or more applications according to a recognition result of the voice recognition unit; and a display control unit configured to display an object for starting the application found by the search on a predetermined display section.

Further features of the present invention will become apparent from the following description of exemplary embodiments (with reference to the attached drawings).

BRIEF DESCRIPTION OF THE DRAWINGS

FIG. 3 is a diagram illustrating correspondence table.

FIG. 4 is a diagram illustrating a dialogue content in voice communication.

FIG. 5 is a diagram illustrating a dialogue content in voice communication.

FIG. 6 is a diagram illustrating a dialogue content in voice communication.

DESCRIPTION OF THE EMBODIMENTS

In the following, embodiments are described in detail with reference to the accompanying drawings. It is noted that the components described in the present embodiment are simply an illustration and the scope of the present invention is not limited to the components.

Figure 1:
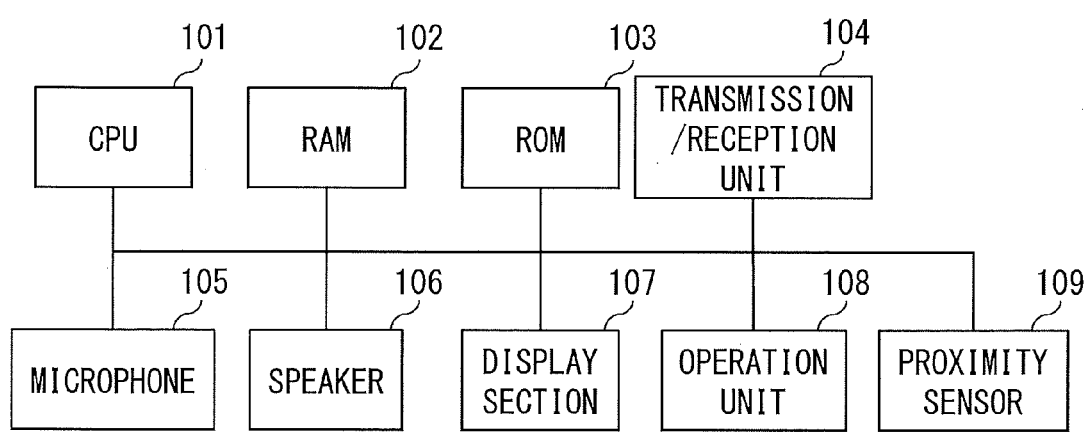
FIG. 1 is a hardware configuration diagram of the information processing apparatus.

FIG. 1 is a hardware configuration diagram of an information processing apparatus, which is capable of voice communication, of the present embodiment. The information processing apparatus may be realized by a portable terminal device which is capable of voice communication, such as portable phones, smart phones, tablet terminals and the like. The information processing apparatus of the present embodiment performs voice communication by executing telephone application (hereinafter referred to as "telephone APP (Application Program)"). In addition to the telephone APP, applications such as "scheduler APP" for managing schedule, "browser APP" for browsing the Web, "memo pad APP" for making a note, "setting APP" for setting the information processing apparatus, "mail APP" for e-mail application and the like are installed in the information processing apparatus.

The information processing apparatus comprises a central processing unit (CPU) 101 for controlling the operation of the information processing apparatus, a random access memory (RAM) 102, and a ROM (Read Only Memory) 103. The CPU 101 reads computer program stored in the ROM 103 and executes the computer program using the RAM 102 as a work area to control the operation of each component of the information processing apparatus. The information processing apparatus includes a transmission/reception unit 104, a microphone 105, a speaker 106, a display section 107, an operation unit 108, and a proximity sensor 109 as the component, the operation of which is controlled by the CPU 101.

The transmission/reception unit 104 transmits the voice of the user, input from the microphone 105, of the information processing apparatus to a device having a voice communication function, which is the voice communication counterpart (hereinafter referred to as "a counterpart device") through a public network. Also, the transmission/reception unit 104 receives the voice of the communication counterpart from the counterpart device transmitted via the public network. The voice of the communication counterpart received is output from the speaker 106.

The display section 107 is, for example, a flat panel display provided on the information processing apparatus, on which an object for starting the application (icon) and an execution screen of the application executed by the CPU 101 are displayed. The operation unit 108 is, for example, a touch panel integrally formed with the display section 107, which receives touch operation by the user. When a position displaying the object for starting the application is touched, the operation unit 108 inputs the touch position to the CPU 101. Based on the touch position input, the CPU 101 determines that the object for starting the application is touched. Then, the CPU 101 starts the application. The proximity sensor 109 is a sensor for detecting a physical object which is brought closer to the information processing apparatus. In the present embodiment, the proximity sensor 109 detects, for example, a user's ear, which is brought closer to the information processing apparatus.

Figure 2:
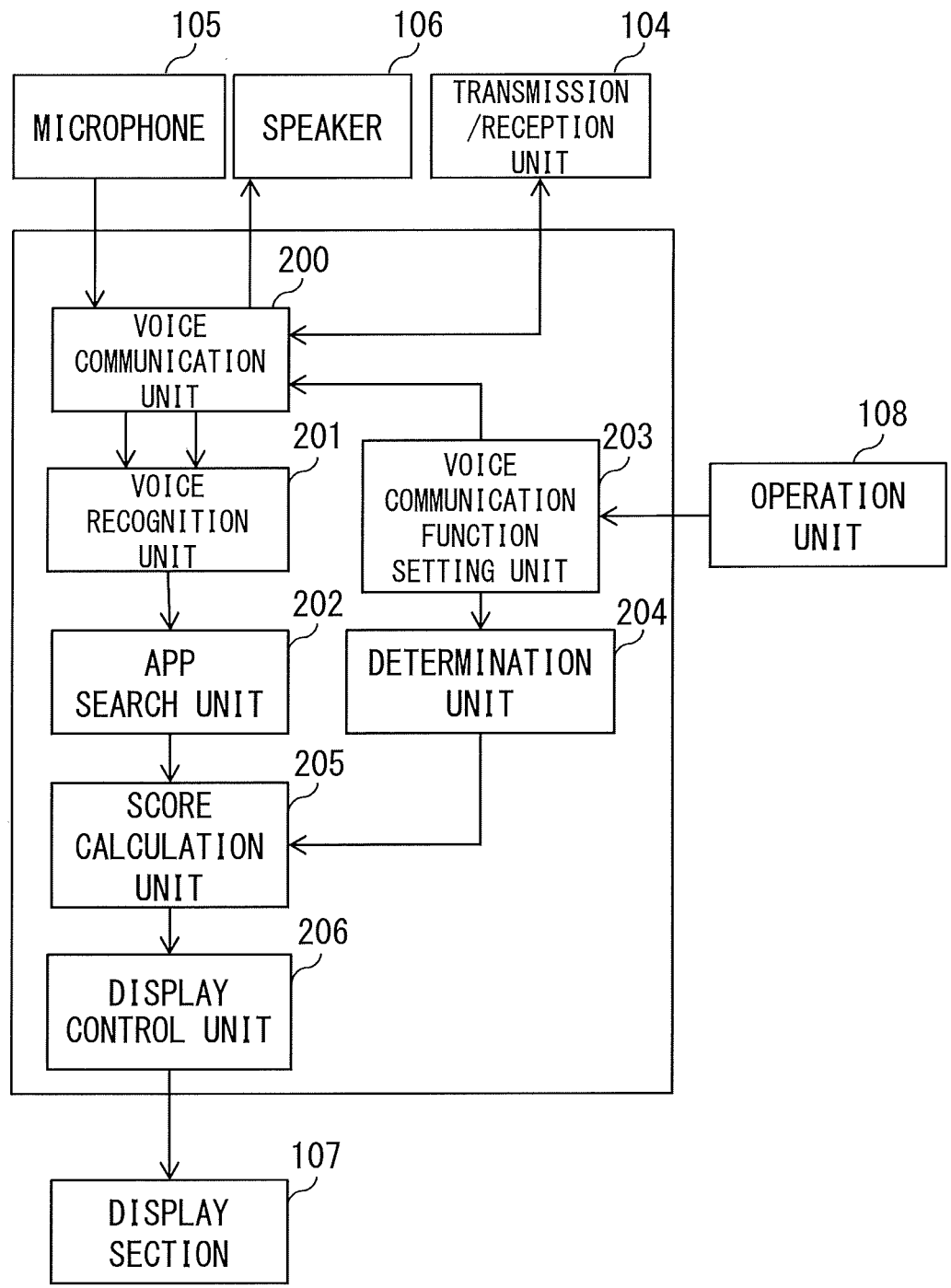
FIG. 2 is a functional block diagram of the information processing apparatus.

FIG. 2 is a functional block diagram which is realized by executing the telephone APP by the information processing apparatus. In the present embodiment, when CPU 101 executes the telephone APP (computer program), a voice communication unit 200, a voice recognition unit 201, an APP search unit 202, a voice communication function setting unit 203, a determination unit 204, a score calculation unit 205, and a display control unit 206 are realized. It is noted that these functions may be realized by hardware.

The voice communication unit 200 controls the voice communication processing through the microphone 105 and the speaker 106. The voice communication unit 200 transmits the voice of the user input from the microphone 105 to the counterpart device through the transmission/reception unit 104. Also, the voice of the user which is input from the microphone 105 is input to the voice recognition unit 201 through the voice communication unit 200. The voice communication unit 200 inputs the voice of the communication counterpart which is input from the counterpart device through the transmission/reception unit 104 to the speaker 106 and the voice recognition unit 201. The voice of the communication counterpart is output from the speaker 106.

The voice recognition unit 201 separately recognizes the voice of the user and the voice of the communication counterpart which are input through the voice communication unit 200. To this end, the voice recognition unit 201 separately obtains the voice of the user and the voice of the communication counterpart from the voice communication unit 200. The voice recognition is performed by general-purpose voice recognition processing. When the voice of the user or the voice of the communication counterpart is input, the voice recognition unit 201 starts the voice recognition processing. The voice recognition unit 201 recognizes the voice of the user and the voice of the communication counterpart in an order of the input. When the silent period of over a fixed period (for example, 500 millisecond) has been detected since the start of the voice recognition processing, the voice recognition unit 201 ends the voice recognition processing. Setting from the start to the end of the voice recognition processing as one dialogue, the voice recognition unit 201 transmits the result of the voice recognition to the APP search unit 202 by a unit of dialogue. It is noted the voice recognition unit 201 may be prepared for the individual voice. That is, the voice recognition unit 201 used for the voice of the user and the voice recognition unit 201 used for the voice of the communication counterpart may individually be prepared.

In response to the result of the voice recognition transmitted from the voice recognition unit 201, the APP search unit 202 searches the related application. The information processing apparatus previously stores, for each application, at least one keyword related to the application. FIG. 3 is a diagram illustrating a correspondence table representing the correspondence relation between such application and the keyword. The information processing apparatus stores such correspondence table. The APP search unit 202 extracts the keyword included in the recognition result of the voice recognition unit 201 and looks up the correspondence table to search the application including the keyword. For example, the keyword related to the "scheduler APP" are "scheduler", "schedule", "appointment", "day of week", and the like. If these keywords are included in the recognition result of the voice recognition unit 201, the APP search unit 202 obtains the scheduler APP as the detection result. It is noted that a basic score representing the degree of relation with the application is set for every keyword. The keyword which has higher relation to the application has a larger value of the basic score. For example, in the "scheduler APP", the basic score of the keyword "scheduler" is "1.0" and the basic score of the keyword "check" is "0.5".

The voice communication function setting unit 203 sets the voice communication function of the telephone APP through the user's operation of the operation unit 108. The communication function includes a mute function, a speaker output function, a hold function, a voice communication end function, and the like. These functions are set through the execution screen of the telephone APP displayed on the display section 107. The user sets the voice communication function through touch operation of the object (button) related to each function which is displayed on the execution screen.

If the mute function is activated, the voice communication unit 200 stops transmitting the voice of the user to the counterpart device. This prevents the communication counterpart from being heard the voice of the user. If the mute function is deactivated, the voice communication unit 200 transmits the voice of the user to the counterpart device. Thereby, the voice of the user can be heard by the communication counterpart. The button for the mute function is of a toggled switch so that every time the user touches the button, the function is activated or deactivated.

When the speaker output function is activated, the voice communication unit 200 turns up the voice which is output from the speaker 106. The loudness of the volume corresponds to loudness by which the voice of the communication counterpart can be heard even when the user holds the information processing apparatus away from his ear. Thereby, the user can hold the information processing apparatus away from his ear and can communicate with the communication counterpart while looking the display section 107 (hands free communication). If the speaker output function is deactivated, the voice communication unit 200 returns the volume of the voice which is output from the speaker 106 to the normal volume. The loudness of the normal volume corresponds to loudness by which the voice of the communication counterpart cannot be heard when the user holds the information processing apparatus away from his ear (normal voice communication). The button for the speaker output function is of a toggled switch so that every time the user touches the button, the function is activated or deactivated.

If the hold function is activated, the voice communication unit 200 does not transmit the voice of the user to the counterpart device and stops receiving the voice from the counterpart device. This prevents the communication counterpart from being heard the voice of the user. This also prevents the user from being heard the voice of the communication counterpart. If the hold function is deactivated, the voice communication unit 200 transmits the voice of the user to the counterpart device and receives the voice from the counterpart device. The button for the hold function is of a toggled switch so that every time the user touches the button, the function is activated or deactivated.

If the voice communication end function is activated, the voice communication unit 200 ends the voice communication.

In a case of normal voice communication through which the user brings the information processing apparatus close to his ear for the voice communication, the mute function, the speaker output function and the hold function are all deactivated. In a case of hands free voice communication through which the user holds the information processing apparatus away from his ear and communicates with the communication counterpart while looking the display section 107, the mute function and the hold function are deactivated and the speaker output function is activated. Further, in a case of hands free voice communication with the use of a headset and earphones, the mute function, the speaker output function and the hold function are all deactivated. It is not necessary that these functions are explicitly activated or deactivated by the user. Instead, these functions may automatically be switched using the detection result of the proximity sensor 109. For example, when the proximity sensor 109 detects that the information processing apparatus is held away from the user's ear while executing the telephone APP, the voice communication function setting unit 203 determines that the user shifted to the hands free voice communication and activates the speaker output function. Further, when the proximity sensor 109 detects that the information processing apparatus is brought closer to the user's ear, the voice communication function setting unit 203 determines that the user shifted to the normal voice communication and deactivates the speaker output function.

According to a state of voice communication, the determination unit 204 determines which should be given priority, the voice of the user or the voice of the communication counterpart. The state of the voice communication is determined by the voice communication function which is set in the voice communication function setting unit 203. An order of priority of the voice of the user and the voice of the communication counterpart reflects an order of display when the application searched by the APP search unit 202 is presented to the user. In the present embodiment, the determination unit 204 weights each of the voice of the user (first voice) and the voice of the communication counterpart (second voice) and determines which of the first voice and the second voice should be given priority. The weight value is set, for example, as follows: default value: "1.0", value when weight is increased: "1.5", and value when weight is decreased: "0.5". By increasing the weight of the voice of the user, the first voice is prioritized. If the weight of the voice of the user is decreased, the weight of the voice of the communication counterpart relatively increases. If the weight of the voice of the communication counterpart increases, the second voice is prioritized. If the weight of the voice of the communication counterpart is decreased, the weight of the voice of the user relatively increases. The determination unit 204 prioritizes the voice having larger weight value.

In the state of the voice communication where the voice of the user cannot be heard by the communication counterpart, the weight of the voice of the user increases. For example, if the mute function is activated, the voice of the user is not transmitted to the communication counterpart so that the weight of the voice of the user increases. Likewise, if the hold function is activated, the voice of the user is not transmitted to the communication counterpart so that the weight of the voice of the user increases. If the mute function and the hold function are deactivated, the weight of the voice of the user is returned to the default value. In the state of the voice communication where the voice of the communication counterpart cannot be heard, the weight of the voice of the communication counterpart decreases. For example, if the user holds the information processing apparatus away from his ear while keeping the output function of the speaker 106 deactivated, the voice of the communication counterpart cannot be heard so that the weight of the voice of the communication counterpart decreases. If the user brings the information processing apparatus close to his ear, or activates the output function of the speaker 106, the weight of the voice of the communication counterpart is returned to the default value.

The score calculation unit 205 calculates a score of each application searched by the APP search unit 202 based on the basic score of the keyword and the weight value. The score is calculated by, for example, the following expression. The score is used to determine the order of display when presenting the application to the user.

(score)=(score of last one dialogue)*(attenuation rate)+(basic score of keyword)*(weight)

The attenuation rate is a value of "0" or more but less than "1". The attenuation rate is used to reduce the influence of past dialogue and increase influence of new dialogue. The attenuation rate reduces the past score for every dialogue. In the following example, the attenuation rate is set as "0.8".

Particular examples of the score are explained using examples of the voice communication shown in FIGS. 4, 5, and 6. In FIGS. 4, 5, and 6, each line represents one dialogue. Setting the first dialogue as "1", a "dialogue number" is incremented by one in order. A "speaker" represents whether the dialogue is by the voice of the user or the voice of the communication counterpart. The words enclosed in parentheses in "dialogue content" are the keywords. The "basic score" represents a value extracted from the correspondence table in FIG. 3. The "score" is, for example, the score for every application calculated by the expression as above. When the voice communication is started, all scores are "0".

Description is given with regard to the score of the dialogue for the dialogue number "2" in FIG. 4. Here, the user brings the information processing apparatus close to his ear for the voice communication. Also, the mute function, the speaker output function, the hold function are all deactivated. In this case, the weight for both the voice of the user and the voice of the communication counterpart is the default value of "1.0". The dialogue content of the dialogue number "2" in FIG. 4 includes the keyword "appointment" relating to the scheduler APP. Looking up the correspondence table shown in FIG. 3, the basic score of the keyword "appointment" of the scheduler APP is "0.8". The score of the scheduler APP of the last one dialogue is "0". The dialogue number "2" in FIG. 4 is the dialogue of the communication counterpart so that the weight is "1.0". Thereby, the score of the scheduler APP is "0.8", which is obtained by the following expression. It is noted that the score of the other application remains "0".

(score)=0*0.8+0.8*1.0=0.8

Description is given with regard to the score of the dialogue for the dialogue number "5" in FIG. 5. Here, the user holds the information processing apparatus away from his ear for the voice communication. Also, the mute function and the speaker output function are activated and the hold function is deactivated. In this case, the voice of the user cannot be heard by the communication counterpart so that the weight of the voice of the user is "1.5" and the weight of the voice of the communication counterpart is the default value of "1.0". The dialogue content of the dialogue number "5" in FIG. 5 includes the keyword "e-mail" relating to the mail APP. Looking up the correspondence table of FIG. 3, the basic score of the keyword "e-mail" of the mail APP is "1.0". The score of the mail APP of the last one dialogue is "0". The dialogue number "5" in FIG. 5 is the dialogue of the user so that the weight is "1.5". Thereby, the score of the mail APP is "1.5", which is obtained by the following expression.

(score)=0*0.8+1.0*1.5=1.5

The dialogue content of the dialogue number "5" in FIG. 5 does not include any keyword relating to the scheduler APP so that the basic score of the scheduler APP is "0". The score of the scheduler APP of the last one dialogue is "0.8". The dialogue number "5" in FIG. 5 is the dialogue of the user so that the weight is "1.5". Thereby, the score of the scheduler APP is "0.6", which is obtained by the following expression. It is noted that the score is rounded off to one decimal place. Also, the score of the other application remains "0".

(score)=0.8*0.8+0*1.5=0.6

As to each dialogue shown in FIG. 6, the score is calculated in a similar manner.

Figure 7A:
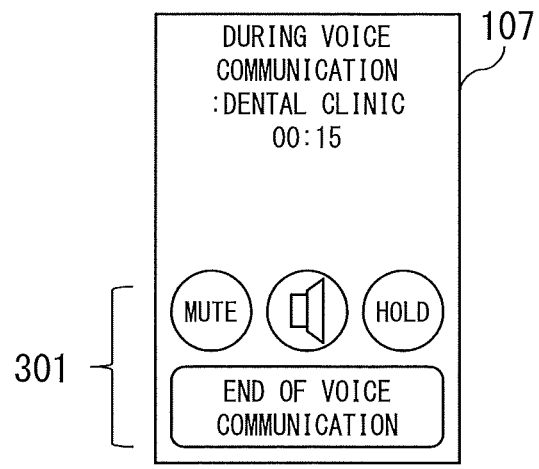
FIGS. 7A and 7B are diagrams illustrating execution screen of telephone APP.
Figure 7B:
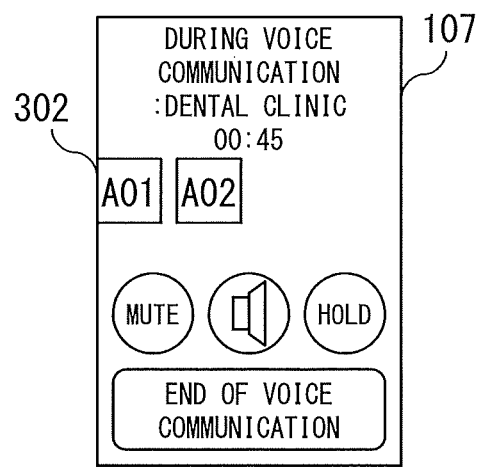
Figure 7C:
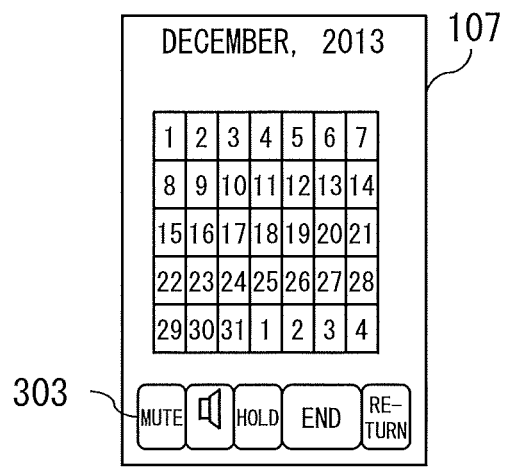
FIG. 7C is a diagram illustrating a case where the scheduler APP is executed while executing the telephone APP.

The display control unit 206 generates image information to be displayed on the display section 107 and outputs the image information to the display section 107. FIGS. 7A to 7C are diagrams illustrating the execution screen which is displayed on the display section 107 by the display control unit 206 when executing the telephone APP. On the execution screen shown in FIG. 7A, the voice communication counterpart and the voice communication time are displayed. Also, buttons 301, which represents the objects related to respective functions including mute, speaker output, hold, and end of the voice communication are displayed on the execution screen. FIG. 7B shows a screen on which APP start buttons 302, which represent the objects for starting the application searched by the APP search unit 202 are aligned on the execution screen shown in FIG. 7A in the order of the score calculated in the score calculation unit 205. FIG. 7C shows a screen in a case where the scheduler APP is executed while the telephone APP is being executed.

On the screen shown in FIG. 7B, the APP start buttons 302 for starting the two applications of "A01" and "A02" during the voice communication are overlappingly displayed on the execution screen of the telephone APP in the order of the score. By touching the APP start button 302, the user can start another application without interrupting the voice communication. Thereby, the user can start the application relating to the dialogue content without any need to go back to the home screen even during the voice communication. It is noted that the "home screen" means the screen on which objects for starting the applications installed in the information processing apparatus are arranged. When many applications are installed in the information processing apparatus, a plurality of screens are used as home screens on which the objects are arranged over. Also, the objects for starting the frequently used applications may be arranged on the lower side of the home screen. Even when there are a plurality of home screens, the same frequently used applications are always displayed on the lower side of each home screen.

On the screen shown in FIG. 7C, the voice communication buttons 303, which represent the objects for setting up the voice communication function, are overlappingly displayed on the execution screen of the application which is started while the telephone APP is being executed. FIG. 7C, shows a case where the scheduler APP is started during the voice communication, the execution screen of the scheduler APP is displayed, and the voice function buttons 303 which correspond to the respective function including mute, speaker output, hold, end of the voice communication, and "return" are displayed under the execution screen of the scheduler APP. Thereby, even in a case where the user started other application during the voice communication, the user can easily set the voice communication function through the execution screen of the other application without any need to go back to the telephone APP. Displaying the voice function buttons 303 on the execution screen of the other application which is started during the voice communication makes it easy for the user to find that the voice communication is going on while the user is operating the application other than the telephone APP. When the "return" button is touched, the display control unit 206 switches the execution screen of the other application which is started during the voice communication to the execution screen of the telephone APP.

Also, when the proximity sensor 109 detected that the user holds the information processing apparatus away from his ear, the display control unit 206 of the present embodiment causes to display the APP start button 302 of the application relating to the dialogue content.

Example of First Voice Communication

Processing of the information processing apparatus is explained using the example of the voice communication shown in FIG. 4. The user brings the information processing apparatus close to his ear to start voice communication. When the voice communication is started, the mute function, the speaker output function, and the hold function are all deactivated.

According to the dialogue content of the dialogue numbers "1" to "5", the user is required to check his schedule. To manage or check the schedule by the scheduler APP, the user holds the information processing apparatus away from his ear and checks the display section 107. In this case, the screen shown in FIG. 7B is displayed on the display section 107 and the APP start buttons 302 are displayed on the execution screen of the telephone APP. The APP start buttons 302 are the objects for starting the scheduler APP and the browser APP. According to the calculation result of the score by the score calculation unit 205, the order of display of the APP start buttons 302, i.e., the scheduler APP (A01) and the browser APP (A02), is determined.

When the user touches the APP start button 302 of the scheduler APP (A01), the scheduler APP is started. By starting the scheduler APP, the display of the display section 107 is changed from what is shown in FIG. 7B to that shown in FIG. 7C. The user can check his schedule through the execution screen of the scheduler APP. After checking the schedule, the user holds the information processing apparatus to his ear and continues the dialogue after the dialogue number "6". As mentioned above, through the simple operation, the user can check his schedule during the voice communication.

Example of Second Voice Communication

Processing of the information processing apparatus is explained using the example of the voice communication shown in FIG. 5. The user holds the information processing apparatus away from his ear and starts the voice communication while looking the display section 107. At the time of starting the voice communication, the mute function and the hold function are deactivated and the speaker output function is activated. Both the weight of the voice of the user and the weight of the voice of the communication counterpart are the default value of "1.0".

According to the dialogue content of the dialogue numbers "1" to "4", the user is required to check his schedule. Suppose that the schedule is e-mailed. At the time of the dialogue of the dialogue number "4", only one of the APP start buttons 302 of the scheduler APP is overlappingly displayed on the execution screen of the telephone APP which is running. However, the APP start button 302 of the mail APP, which the user wishes to start, is not displayed. In this case, the user first activates the mute function to prevent the voice of the user from being transmitted to the communication counterpart. This is because the subsequent dialogue of the dialogue number "5" is the dialogue for voice operation to the information processing apparatus so that it is not necessary to transmit the voice to the communication counterpart. It means that when the mute function is activated, the information processing apparatus determines that the subsequent voice of the user is the dialogue for the voice operation and increases the weight. This is because the voice operation reflects the user's intention.

The APP search unit 202 searches the mail APP according to the dialogue content of the dialogue number "5". The voice of the user cannot be heard by the communication counterpart so that the determination unit 204 increases the weight of the voice of the user to "1.5".

Thereby, the score of the mail APP intended by the user increases, thus, among the APP start buttons 302, the button for starting the mail APP is displayed in the higher order. The user touch-operates the APP start button 302 of the mail APP to start the mail APP. The user operates the execution screen of the mail APP and checks the schedule. After checking the e-mail, the user deactivates the mute function and continues the dialogue after the dialogue number "6".

As mentioned above, according to the setting of the voice communication function, the information processing apparatus automatically increases the weight to the voice operation so that the APP start button 302 of the application which is intended by the user can be displayed in the higher order.

Example of Third Voice Communication

Processing of the information processing apparatus is explained using the example of the voice communication shown in FIG. 6. The user brings the information processing apparatus close to his ear to start voice communication. At the time of starting the voice communication, the mute function, the speaker output function, and the hold function are all deactivated. Both the weight of the voice of the user and the weight of the voice of the communication counterpart are the default value of "1.0".

According to the dialogue content of the dialogue numbers "1" to "6", the user is required to check a "customer ID". Suppose that the user records the "customer ID" using the memo pad APP. To check the "customer ID", the user holds the information processing apparatus away from his ear and looks the display section 107. The APP start buttons 302, which respectively correspond to the scheduler APP and the browser APP, are overlappingly displayed in order on the execution screen of the telephone APP (see FIG. 7B).

To search the memo pad APP, the user utters "memo pad" in the dialogue number "7". In response to the dialogue, the APP search unit 202 searches the memo pad APP. Also, at this time, the voice of the communication counterpart cannot be heard so that the determination unit 204 increases the weight of the voice of the user to "1.5". Thereby, the score of the memo pad APP intended by the user increases. As a result, the APP start button 302 of the memo pad APP intended by the user is displayed in the higher order. It is noted that at this time, the weight of the voice of the communication counterpart temporarily decreases. It means that when the proximity sensor 109 detects that the information processing apparatus is held away from the ear, the weight of the voice of the user increases.

Figure 8A:
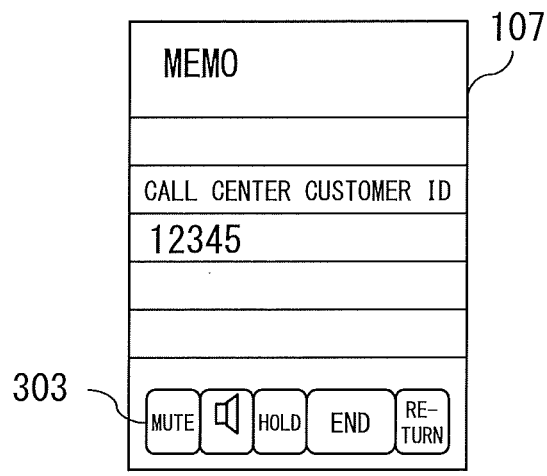
FIGS. 8A and 8B are diagrams illustrating a case where memo pad APP is started while executing the telephone APP and FIG. 8C is a diagram illustrating a case where home screen is displayed while executing the telephone APP.
Figure 8B:
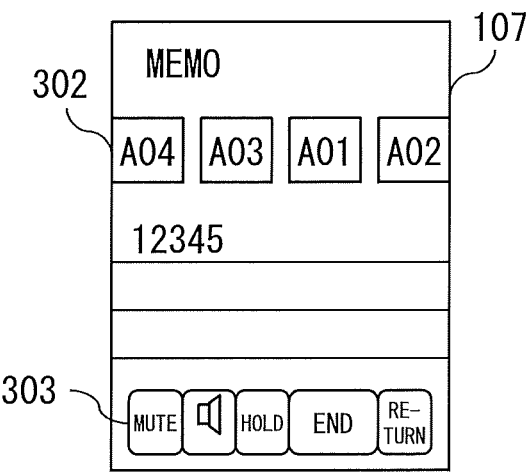
Figure 8C:
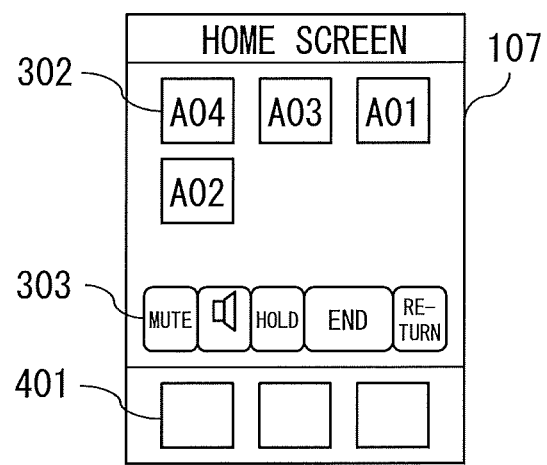

The user touches the APP start button 302 of the memo pad APP to start the memo pad APP. FIGS. 8A to 8C represent examples of the display when the memo pad APP is started. The user can check the "customer ID" by the execution screen of the memo pad APP shown in FIG. 8A. The user having checked the "customer ID" activates the speaker output function and continues the dialogue after the dialogue number "8" while looking the display section 107. The voice of the communication counterpart can be heard, so that the weight of the voice of the communication counterpart returns to the default value.

In the dialogue of the dialogue number "11", the communication counterpart requires the start of the setting APP. As the weight of the voice of the communication counterpart has returned to the default value, the APP start button 302 of the setting APP which is intended by the communication counterpart is displayed on the top. This is a situation where the user is asking the communication counterpart so that the setting APP intended by the communication counterpart is also the application intended by the user.

FIG. 8B represents a screen on which the APP start buttons 302 which respectively correspond to the setting APP (A04), the memo pad APP (A03), the scheduler APP (A01), and the browser APP (A02) are overlappingly displayed in order on the execution screen of the memo pad APP. Such a display makes it easy for the user to start another application relating to the dialogue content after starting the memo pad APP during the voice communication. It is noted that it is not necessary to display the APP start button 302 of the memo pad APP (A03) which is running.

The score of the memo pad APP is left as it is, which is used to determine the order of display of the APP start buttons in a case where the other application is started. The user touches the start button 302 of the setting APP to start the setting APP and continues the dialogue after the dialogue number "12". It is noted that, immediately after starting the other application, as shown in FIG. 8A, the APP start buttons 302 are removed to make the execution screen easy to view. If any keyword is included in the subsequent dialogue, the APP start buttons 302 are displayed again in the new order of display.

As mentioned, even in a case where the application other than the telephone APP is started during the voice communication, it is possible to directly start another application. Also, the application which accommodates the intention of the communication counterpart can be displayed in the higher order of the APP start button 302.

Operation when Executing Telephone APP

Figure 9:
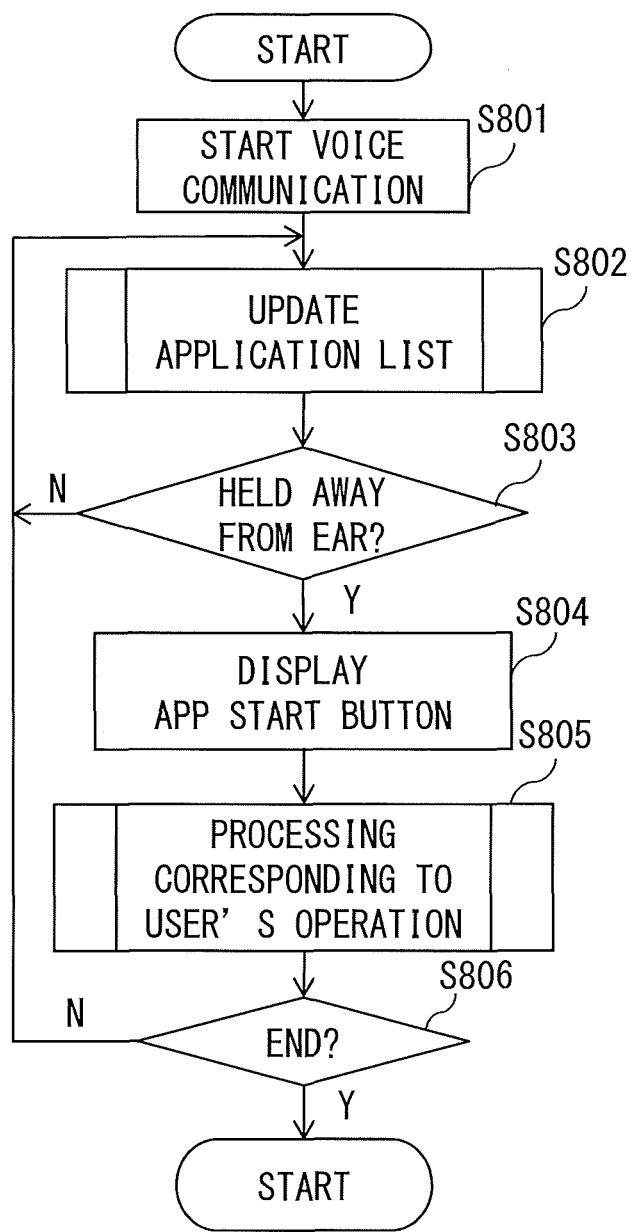
FIG. 9 is a flowchart representing processing procedure when executing the telephone APP.

FIG. 9 is a flowchart illustrating processing procedure in a case where the telephone APP is executed in such information processing apparatus. When the user instructs the information processing apparatus to execute the telephone APP, the information processing apparatus executes the telephone APP. The user instructs the information processing apparatus to execute the telephone APP by, for example, touch-operating the object for starting the telephone APP which is displayed on the home screen.

When the execution of the telephone APP is instructed, the information processing apparatus starts the voice communication with the counterpart device through the voice communication unit 200 (S801). When the voice communication is started, the display control unit 206 displays the execution screen of the telephone APP shown in FIG. 7A on the display section 107. The score calculation unit 205 updates application list representing the correspondence between the application searched by the APP search unit 202 and the score (S802). Detail of application list update processing is described later.

The proximity sensor 109 of the information processing apparatus detects whether or not the information processing apparatus is held away from the user's ear (S803). If it is determined that the information processing apparatus is held away from the user's ear (S803: Y), the display control unit 206 overlappingly displays the APP start button 302 corresponding to the application list on the execution screen of the telephone APP which is currently being displayed (S804). If it is determined that the information processing apparatus is not held away from user's ear (S803: N), the voice communication is going on so that the CPU 101 continues updating the application list.

When the screen shown in FIG. 7B is displayed on the display section 107, the CPU 101 performs processing corresponding to the user's operation (S805). The user's operation includes the operation to the application being displayed, the operation on the APP start button 302, and the operation on the voice communication function button 303. Details of the processing to the user's operation are described later.

When the processing corresponding to the user's operation ends, the CPU 101 determines whether the user performed operation to end the voice communication or not (S806). The user performs the operation to end the voice communication by touching the voice communication end button 301. If it is determined that the operation to end the voice communication is not performed (S806: N), the CPU 101 updates the application list. If it is determined that the operation to end the voice communication is performed (S806: Y), the CPU 101 ends the execution of the telephone APP.

Figure 10:
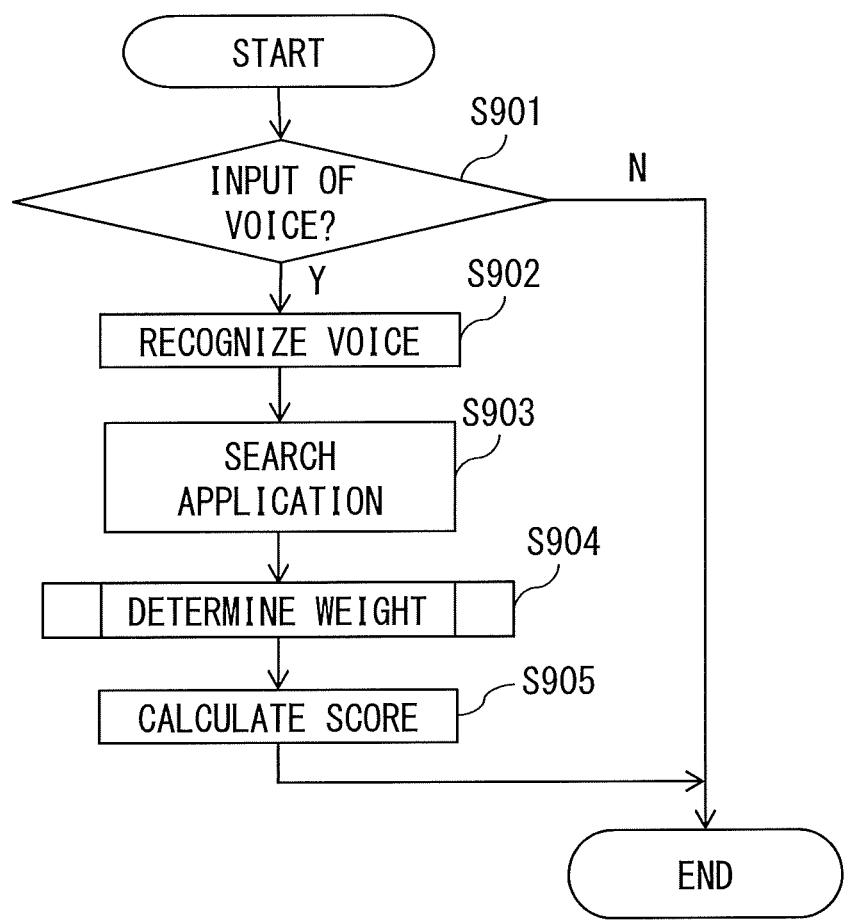
FIG. 10 is a flowchart illustrating application list updating processing.

FIG. 10 is a flowchart of application list update processing of S802 of FIG. 9.

The CPU 101 first determines whether there is an input of the voice of the user or the voice of the communication counterpart to the voice communication unit 200 (S901). If it is determined that there is no input of the voice (S901: N), the CPU 101 determines that the dialogue is ended and ends the application list update processing. If it is determined that there is the input of the voice (S901: Y), the voice recognition unit 201 performs voice recognition processing to the voice which is input from the voice communication unit 200 (S902). The voice recognition unit 201 inputs the recognition result to the APP search unit 202. The APP search unit 202 searches the application according to the recognition result input from the voice recognition unit 201 (S903). The APP search unit 202 inputs the search result of the application to the score calculation unit 205. The determination unit 204 determines the weight of the voice of the user and the weight of the voice of the communication counterpart (S904). Detail of weight determination processing is described later. The score calculation unit 205 calculates the score of the application searched by the APP search unit 202 based on the basic score and the weight of the voice of the user and the weight of the voice of the communication counterpart determined by the determination unit 204 (S905). The CPU 101 updates the application list based on the score calculated. Through the above mentioned processing, the score is calculated for every application and application list is updated.

Figure 11:
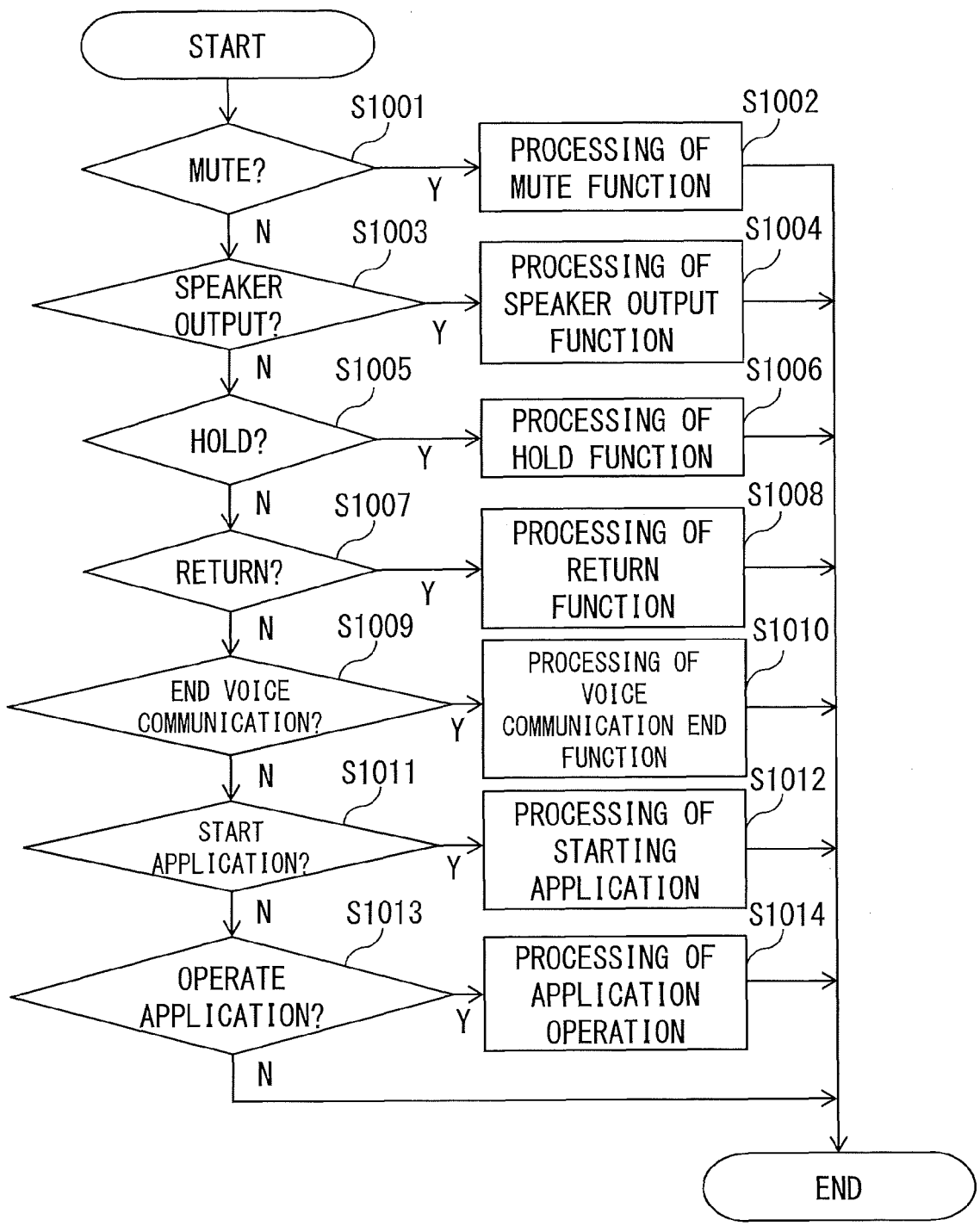
FIG. 11 is a flowchart representing processing to user's operation.

FIG. 11 is a flowchart of processing to the user's operation in the processing of S805 in FIG. 9. Any one of the screens shown in FIGS. 7A to 7C is displayed on the display section 107. The user performs the operation to the application being displayed, the operation on the button 301, the operation on the APP start button 302, and the operation on the voice communication function button 303 through the screens.

The CPU 101 determines whether the user touch-operated the button corresponding to the mute function from the buttons 301 or the voice communication function buttons 303 (S1001). If it is determined that the button corresponding to the mute function is touch-operated (S1001: Y), the voice communication function setting unit 203 deactivates the mute function if it is activated, and activates the mute function if it is deactivated. Then, the voice communication setting function unit 203 ends the processing (S1002).

If it is determined that the button corresponding to the mute function is not touch-operated (S1001: N), the CPU 101 determines whether the user touch-operated the button corresponding to the speaker output function from the buttons 301 or the voice communication function buttons 303 (S1003). If it is determined that the button corresponding to the speaker output function is touch-operated (S1003: Y), the voice communication function setting unit 203 deactivates the speaker output function if it is activated and activates the speaker output function if it is deactivated (S1004).

If it is determined that the button corresponding to the speaker output function is not touch-operated (S1003: N), the CPU 101 determines whether the user touch-operated the button corresponding to the hold function from the buttons 301 or the voice communication function buttons 303 (S1005). If it is determined that the button corresponding to the hold function is touch-operated (S1005: Y), the voice communication function setting unit 203 deactivates the hold function if it is activated and activates the hold function if it is deactivated (S1006).

If it is determined that the button corresponding to the hold function is not touch-operated (S1005: N), the CPU 101 determines whether the user touch-operated the button corresponding to the return function from the buttons 301 or the voice communication function buttons 303 (S1007). If it is determined that the button corresponding to the return function is touch-operated (S1007: Y), the display control unit 206 switches the execution screen of the application currently being displayed to the execution screen of the telephone APP. If the APP start button 302 is displayed on the application, the display control unit 206 removes the display of the button (S1008).

If it is determined that the button corresponding to the return function is not touch-operated (S1007: N), the CPU 101 determines whether the user touch-operated the button corresponding to the voice communication end function from the buttons 301 or the voice communication function buttons 303 (S1009). If it is determined that the button corresponding to the voice communication end function is touch-operated (S1009: Y), the CPU 101 ends the voice communication. If the APP start buttons 302 and the voice communication function buttons 303 are displayed, the display control unit 206 removes the display of the buttons (S1010).

If it is determined that the button corresponding to the voice communication end function is not touch-operated (S1009: N), the CPU 101 determines whether the user touch-operated any one of the APP start buttons 302 or not (S1011). If it is determined that any one of the APP start buttons 302 is touch-operated (S1011: Y), the CPU 101 starts the application corresponding to the button which is touch-operated (S1012). The display control unit 206 displays the execution screen of the application started on the display section 107. The display control unit 206 overlappingly displays the voice communication function button 303 on the execution screen of the application. If the APP start buttons 302 are displayed, the display control unit 206 removes the display of the button.

If it is determined that none of the APP start buttons 302 is touch-operated (S1011: N), the CPU 101 determines whether the user performed operation to the execution screen of the application being displayed (S1013). If it is determined that the user performed the operation to the execution screen of the application being displayed (S1013: Y), the CPU 101 performs processing corresponding to the user's operation and ends the processing (S1014). For example, if the execution of the scheduler APP is instructed, the CPU 101 displays the schedule which is managed by the scheduler APP. If it is determined that the user does not perform the operation to the execution screen of the application being displayed (S1013: N), the CPU 101 ends the processing as it is.

The CPU 101 determines the button which is touch-operated by the user and performs processing corresponding to the button determined. However, the procedure to determine the button having touch-operated is not limited to the above.

Figure 12:
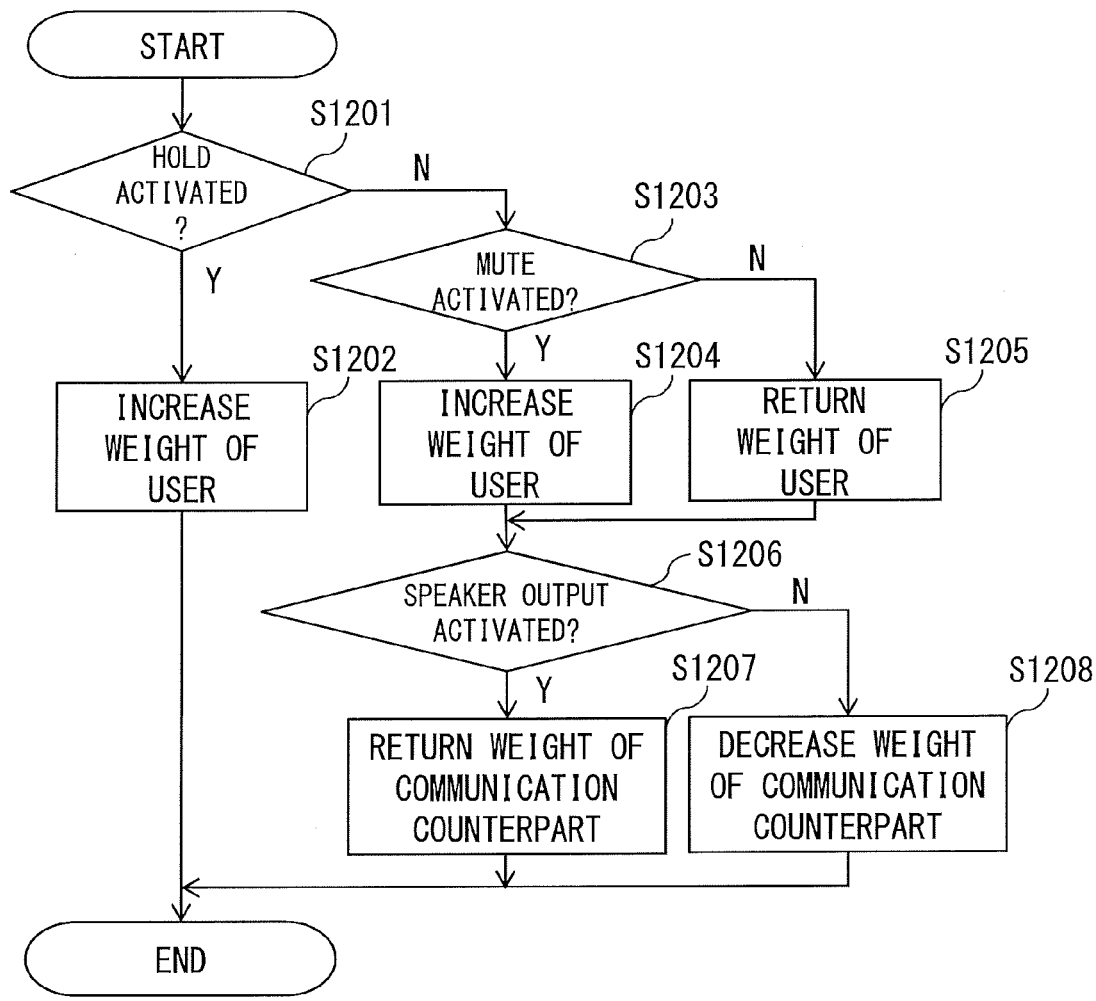
FIG. 12 is a flowchart representing weight determination processing.

FIG. 12 is a flowchart of weight determination processing of S904 of FIG. 10. The weight of the voice of the user and the weight of the voice of the communication counterpart when the information processing apparatus started processing is set to the default value of "1.0".

When the weight determination processing is started, the determination unit 204 determines whether the hold function is activated or not (S1201). If it is determined that the hold function is activated (S1201: Y), the determination unit 204 increases the weight of the voice of the user (S1202). The determination unit 204 sets the weight of the voice of the user to, for example, "1.5". The determination unit 204 having increased the weight of the user ends the weight determination processing.

If the hold function is deactivated (S1201: N), the determination unit 204 determines whether the mute function is activated or not (S1203). If it is determined that the mute function is activated (S1203: Y), the determination unit 204 increases the weight of the voice of the user (S1204). The determination unit 204 sets the weight of the voice of the user to, for example, "1.5". If it is determined that the mute function is deactivated (S1203: N), the determination unit 204 returns the weight of the voice of the user to the default value of "1.0" (S1205).

Thereafter, the determination unit 204 determines whether the speaker output function is activated or not (S1206). If it is determined that the speaker output function is activated (S1206: Y), the determination unit 204 returns the weight of the voice of the communication counterpart to the default value of "1.0" (S1207). If it is determined that the speaker output function is deactivated (S1206: N), the determination unit 204 decreases the weight of the voice of the communication counterpart (S1208). The determination unit 204 sets the weight of the voice of the communication counterpart to, for example, "0.5". The determination unit 204 having set the weight of the voice of the communication counterpart ends the weight determination processing.

The determination unit 204 determines whether the holding function, the mute function, and the speaker output function are activated or not, based on the result of the voice communication setting by the voice communication function setting unit 203. Through the above mentioned processing, the determination unit 204 determines the weight of the voice of the user and the weight of the voice of the communication counterpart. The determination unit 204 determines to give priority to the one which has a higher value of the weight between the weight of the voice of the user and the weight of the voice of the communication counterpart.

Thereby, even in a case where the user of the information processing apparatus starts the application other than the telephone APP during the voice communication, use of the information processing apparatus as mentioned reduces the possibility that the user starts the application which is not intended by the user. Thereby, operability of the information processing apparatus increases.

In the description of the embodiments as above, the information processing apparatus is to display the APP start buttons 302 for starting the application searched by the APP search unit 202 on the execution screen of the telephone APP. In addition to this, if the telephone APP is being executed, the information processing apparatus may display the APP start buttons 302 even in a case where the screen display is returned to the home screen. FIG. 8C is an example of a screen in a case where the information processing apparatus displays the home screen while the telephone APP is being executed.

In FIG. 8C, instead of icons corresponding to the applications which are normally displayed on the home screen, the APP start buttons 302 of the applications searched by the APP search unit 202 are displayed. Also, the voice communication function buttons 303 are displayed. Objects 401 for starting the frequently used applications are displayed under the home screen.

Even in a case where the information processing apparatus is returned to the home screen, the user can easily start the application relating to the voice communication through the APP start button 302. Also, the voice communication function buttons 303 are displayed on the home screen so that the user can understand that the telephone APP is being executed.

In addition to the voice communication function which is set by the voice communication function setting unit 203, the determination unit 204 can determine the weight of the voice of the user and the weight of the voice of the communication counterpart according to the loudness of noise around the information processing apparatus. In this case, the information processing apparatus comprises, for example, a noise measuring function which measures the loudness of the noise which is input, for example, from the microphone 105. If the measured noise is more than or equal to a fixed value (for example, 80 [dB]), the information processing apparatus determines that the voice of the communication counterpart cannot be heard by the user. The determination unit 204 determines the order of priority of the voice of the user and the voice of the communication counterpart by changing the weight according to the determination result.

When the user is at a very noisy place such as a platform where a train is passing, the user finds it difficult to hear the voice of the communication counterpart. However, the voice of the communication counterpart received in the transmission/reception unit 104 does not include any noise around the information processing apparatus. Thereby, regardless of the noise around the information processing apparatus, the voice recognition unit 201 recognizes the voice of the communication counterpart and the APP start buttons 302 are displayed. It means that, the display of the display section 107 is changed by the voice of the communication counterpart which is not heard by the user, which brings confusion to the user. Thereby, the noise around the information processing apparatus is measured and, based on the result measured, the weight of the voice of the communication counterpart is decreased. This prevents the display on the display section 107 from being changed by the voice of the communication counterpart which is not heard by the user. This prevents the confusion of the user.

The voice recognition unit 201 may switch the voice which is subject for the voice recognition according to the state of the voice communication. For example, the voice recognition unit 201 only recognizes the voice which is determined to be given priority by the determination unit 204. It means that if the determination unit 204 determines to give priority to the voice of the user, the voice recognition unit 201 recognizes the voice of the user and does not recognize the voice of the communication counterpart. If the determination unit 204 determines to give priority to the voice of the communication counterpart, the voice recognition unit 201 recognizes the voice of the communication counterpart and does not recognize the voice of the user.

The information processing apparatus as mentioned displays the object for starting the application searched according to the voice recognition result on a predetermined display section, which prevents starting the application which is not intended by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-139390, filed Jul. 7, 2014 which is hereby incorporated by reference wherein in its entirety.

What is claimed is:

1. An information processing apparatus, comprising:
a voice communication unit configured to perform a voice communication with a counterpart device which comprises a voice communication function;
a voice recognition unit configured to perform voice recognition processing of a first voice and a second voice, the first voice is the voice which is transmitted to the counterpart device by a voice communication through the voice communication unit, and the second voice is the voice which is input from the counterpart device;
a search unit configured to search one or more applications according to a recognition result of the voice recognition unit;
a display control unit configured to display one or more objects for starting the one or more applications found by the search on a predetermined display section; and
a determination unit configured to determine which of the first voice and the second voice should be given priority according to a state of the voice communication by the voice communication unit,
wherein the display control unit is further configured to display the one or more objects on the display section in an order which is based on the determination by the determination unit.

2. The information processing apparatus according to claim 1, wherein the display control unit is further configured to overlappingly display the one or more objects on an execution screen of an application for performing the voice communication.

3. The information processing apparatus according to claim 1, further comprising:
a storing unit for storing, for each one or more applications, at least one keyword related to the application,
wherein the search unit is further configured to extract the keyword included in the recognition result of the voice recognition unit to search an application related to the keyword.

4. The information processing apparatus according to claim 3,
wherein the determination unit is further configured to determine which of the first voice and the second voice should be given priority based on a value representing weight of the first voice and a value representing weight of the second voice, the information processing apparatus further comprising:
a calculation unit configured to calculate a score for determining an order of display when displaying the one or more objects according to degree of relation between the keyword used for the search and the application searched, and the value representing the weight of the first voice or the value representing the weight of the second voice,
wherein the display control unit is further configured to display the one or more objects on the display section in the order according to the score.

5. The information processing apparatus according to claim 1,
wherein the determination unit is further configured to determine which of the first voice and the second voice should be given priority based on a value representing weight of the first voice and a value representing weight of the second voice.

6. The information processing apparatus according to claim 1,
wherein the determination unit is further configured to give priority to the first voice over the second voice in a state of the voice communication where the first voice is not transmitted to the counterpart device.

7. The information processing apparatus according to claim 1,
wherein the determination unit is further configured to give priority to the first voice over the second voice in a state of the voice communication where the second voice cannot be heard by a user of the information processing apparatus.

8. The information processing apparatus according to claim 1, further comprising:
a proximity sensor for detecting a physical object which is brought closer to the information processing apparatus,
wherein the determination unit is further configured to determine to give priority to the first voice over the second voice in a case where the proximity sensor detects an ear of a user of the information processing apparatus.

9. The information processing apparatus according to claim 1, further comprising:
a noise measuring unit configured to measure ambient noise,
wherein the determination unit is further configured to determine which of the first voice and the second voice should be given priority according to loudness of the noise.

10. A method which is executed by an information processing apparatus comprising a voice communication unit for performing a voice communication with a counterpart device comprising a voice communication function, comprising:
performing voice recognition processing of first voice and second voice, the first voice is the voice which is transmitted to the counterpart device by a voice communication through the voice communication unit, the second voice is the voice which is input from the counterpart device;
searching one or more applications according to a recognition result of the voice recognition processing;
displaying one or more objects for starting the one or more applications searched on a predetermined display section; and
determining which of the first voice and the second voice should be given priority according to a state of the voice communication by the voice communication unit,
wherein the one or more objects is displayed on the display section in an order which is based on the determining.

11. The method according to claim 10, wherein the information processing apparatus comprises a predetermined storing unit for storing, for each of the one or more applications, at least one keyword related to the application, further comprising:
extracting the keyword included in the recognition result of the voice recognition processing and searching an application related to the keyword from the predetermined storing unit.

12. The method according to claim 11, further comprising:
determining which of the first voice and the second voice should be given priority based on a value representing weight of the first voice and a value representing weight of the second voice:
calculating, by the information processing apparatus, a score for determining an order of display when displaying the one or more objects according to degree of relation between the keyword used for the search and the application searched, and the value representing the weight of the first voice or the value representing the weight of the second voice; and
displaying, by the information processing apparatus, the one or more objects on the display section in the order according to the score.

13. The method according to claim 10, further comprising:
determining, by the information processing apparatus, which of the first voice and the second voice should be given priority according to a value representing weight of the first voice and a value representing weight of the second voice.

14. The display control method according to claim 10, comprising:
determining, by the information processing apparatus, to give priority to the first voice over the second voice in a state of the voice communication where the first voice is not transmitted to the counterpart device, and
determining, by the information processing apparatus, to give priority to the first voice over the second voice in a state of the voice communication where the second voice cannot be heard by a user of the information processing apparatus.

15. The method according to claim 10, wherein the information processing apparatus comprises a proximity sensor for detecting a physical object which is brought closer to the information processing apparatus, comprising:
determining to give priority to the first voice over the second voice in a case where the proximity sensor detects an ear of a user of the information processing apparatus.

16. The method according to claim 10, wherein the information processing apparatus comprises a noise measuring unit configured to measure ambient noise, comprising:
determining which of the first voice and the second voice should be given priority according to loudness of the noise.

17. A computer readable non-transient storage medium containing a computer program for causing a computer, which has a voice communication unit for performing a voice communication with a counterpart device which comprises a voice communication function, to function as:
a voice recognition unit configured to perform voice recognition processing of first voice and second voice, the first voice is the voice which is transmitted to the counterpart device by a voice communication through the voice communication unit, the second voice is the voice which is input from the counterpart device;
a search unit configured to search one or more applications according to a recognition result of the voice recognition unit;
a display control unit configured to display one or more objects for starting the one or more applications searched by the search unit on a predetermined display section; and
a determination unit configured to determine which of the first voice and the second voice should be given priority according to a state of the voice communication by the voice communication unit,
wherein the display control unit is further configured to display the one or more objects on the display section in an order which is based on determination by the determination unit.

* * * * *